(12) United States Patent
Bultema et al.

(10) Patent No.: US 9,516,119 B2
(45) Date of Patent: Dec. 6, 2016

(54) SERVICE PROVIDER NETWORK MIGRATION

(71) Applicant: ACCENTURE GLOBAL SERVICES LIMITED, Dublin (IE)

(72) Inventors: Paul J. Bultema, Englewood, CO (US); John A. Morgan, Skillman, NJ (US); Stephen M. Dadoly, Princeton, NJ (US); William L. Gewirtz, Edison, NJ (US); Christopher Yen-Chu Chan, Jersey City, NJ (US); John D. Bolze, Rockville, MD (US); Lan Guan, Johns Creek, GA (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 0 days.

(21) Appl. No.: 14/423,740

(22) PCT Filed: Oct. 7, 2014

(86) PCT No.: PCT/US2014/059552
§ 371 (c)(1),
(2) Date: Feb. 25, 2015

(87) PCT Pub. No.: WO2015/054300
PCT Pub. Date: Apr. 16, 2015

(65) Prior Publication Data
US 2016/0212222 A1 Jul. 21, 2016

Related U.S. Application Data

(60) Provisional application No. 61/888,214, filed on Oct. 8, 2013.

(51) Int. Cl.
*G06F 15/16* (2006.01)
*H04L 29/08* (2006.01)
*H04L 12/24* (2006.01)

(52) U.S. Cl.
CPC .......... *H04L 67/16* (2013.01); *H04L 41/0813* (2013.01); *H04L 41/5045* (2013.01); *H04L 67/34* (2013.01)

(58) Field of Classification Search
CPC ............... G06F 2009/4557; G06F 3/0647; G06F 11/203; G06F 17/30079; G06F 11/3051; G06F 17/303; H04W 16/00
USPC ............... 709/220–222, 223, 224, 226
See application file for complete search history.

(56) References Cited

U.S. PATENT DOCUMENTS

| 7,831,695 | B1 * | 11/2010 | Burr .................... H04L 41/0813 709/220 |
| 8,082,335 | B2 | 12/2011 | Mishra et al. |
| 2010/0292976 | A1 | 11/2010 | Newcombe et al. |
| 2012/0151061 | A1 | 6/2012 | Bartfai-Walcott et al. |

(Continued)

OTHER PUBLICATIONS

International Search Report and Written Opinion dated Jan. 21, 2015, issued on PCT Patent Application No. PCT/US2014/059552, filed on Oct. 7, 2014.

*Primary Examiner* — David Lazaro
(74) *Attorney, Agent, or Firm* — Mannava & Kang, P.C.

(57) ABSTRACT

A service provider network migration system migrate services from a first network infrastructure to a second network infrastructure. A joined circuits dataset is created that associates circuits in the first network infrastructure with a service provided by the circuit and a customer receiving the service via the first network infrastructure. A product mappings dataset is created that maps each service in the first network infrastructure to at least one target service to be provided in the second network infrastructure. A migration sequencing server creates a migration plan according to the information in the datasets, and forecasts for customer migration rate and revenue generation for the target services are estimated. A provisioning server configures parameters for the circuits in the second network infrastructure via a network according to the migration plan to deploy the target services in the second network infrastructure.

17 Claims, 11 Drawing Sheets

(56) References Cited

U.S. PATENT DOCUMENTS

2014/0165063 A1* 6/2014 Shiva .................. G06F 21/57
718/1

2015/0019197 A1* 1/2015 Higginson ............ G06F 17/303
703/22

2016/0004582 A1* 1/2016 Nagura ............... H04L 41/0663
714/15

* cited by examiner

Scoring Matrix

Aggregate Score: 4.85 (5=Best 1=Worst)   Estimated NPV: +$4,401,056   IRR: 5.54%   Estimated ROI: 54 Months

| Area | Criteria | This WC | | | Average of all WC | | | Scoring Method |
|---|---|---|---|---|---|---|---|---|
| | | Score | Magnitude | | Score | Magnitude | | |
| Customer | Migration Impact Level | 2.7 | N/A | | 3.2 | N/A | | 1=Low - 5=High |
| Complexity | Coordinated Migrations Ratio | 15% | N/A | | 21% | N/A | | 0%=None, 100%=All |
| Size | Number of Circuits | 61,334 | 61,334 | | 42,776 | 42,776 | | Count of Circuits |
| Size | Number of Migrations | 42,993 | 42,993 | | 29,943 | 29,943 | | Count of Circuits |
| Productivity | Execution Velocity | 0.33 | N/A | | 0.37 | N/A | | Migrations/HR/HC |
| CAPEX | Network Modernization Costs | 7.54 | $452,500 | | 12.80 | $512,250 | | $/Circuit |
| Reoccur Rev | Revenue Gain / Loss | +2.32% | +$552K/Qtr | | +3.05% | +189K/Qtr | | % +/- |
| Reoccur Rev | Subscriber Gain / Loss | -6.96% | -4,300 | | -8.45% | -3,655 | | % +/- |
| Onetime Exp | Customer Migration Costs | $112.60 | $4,834,346 | | $141.54 | $4,245,160 | | $/Migration |
| Onetime Exp | Network Migration Costs | $404.56 | $18,555,712 | | $557.83 | $16,694,202 | | $/Migration |
| Onetime Exp | Salvage Costs | $11.45 | $598,450 | | $12.56 | $527,520 | | $/Circuit |
| Onetime Rev | Salvage Recovery | $24.36 | $1,494,096 | | $28.32 | $1,189,440 | | $/Circuit |
| Reoccur Sav | Operating Savings | $12.05 | $514,097 | | $10.41 | $306,054 | | $/Migration/Qtr |

View provides financial and operational measures and ratios for ranking scenarios Individual customer scores roll up into wire center or product score cards The magnitude of numbers used to score is also provided Scores may be ratios or percentages and allow comparison across plans

FIG. 9

SERVICE PROVIDER NETWORK MIGRATION

PRIORITY

This present application is a national stage filing under 35 U.S.C. 371 of PCT application No. PCT/US2014/059552, having an international filing date of Oct. 7, 2014, which claims priority to U.S. provisional patent application Ser. No. 61/888,214, filed on Oct. 8, 2013, which are hereby incorporated by reference in their entireties.

BACKGROUND

Companies, such as traditional communications network service providers (e.g., wireline service providers, cellular service providers, cable service providers, satellite service providers, etc.), application-specific service providers, and other types of companies face great competitive pressure to provide the best service to their customers and to develop and deploy new services to the marketplace faster than their competitors.

Furthermore, major telecommunication providers, cable network carriers and other types of service providers may have extremely large legacy networks in place, which may service thousands or millions of customers. The array of legacy products and services provided by these carriers can be large and complex. Also, the type of customers may be diverse. For example, a customer base may vary from small single site voice and data customers up to the largest multi-national corporations which subscribe to hundreds of legacy services across tens, hundreds or even thousands of locations worldwide. Furthermore, legacy network infrastructures of telecommunication providers may span tens of thousands of central office wire centers worldwide.

To keep up with demand and to provide the level of service required by many customers, new infrastructures need to be rolled out and customers should be migrated to these new infrastructures. For example, internet protocol (IP) and extremely high-capacity, fiber optic networks may be mandatory for providing the level of service required or desired by many customers. As a result, service providers may be faced with undergoing a comprehensive analysis to enable educated decisions for the rapid creation and deployment of telecommunication networks and services that meet their customer demands, minimize service disruption during rollout, and provide the highest quality of service within the customer demands. However, due to the cost, difficulty and know-how needed for undergoing such an analysis, many companies may fall short in their analysis, possibly resulting in failure to meet customer demands, failure to improve quality of service, failure to maximize revenue and failure to minimize customer loss.

SUMMARY

According to an embodiment, a system migrates network services from a first network infrastructure to a second network infrastructure. The first network infrastructure may include a first set of circuits providing voice and data services over a network to customer premises. A service provider network migration system includes at least one inventory and provisioning server to capture data from the plurality of circuits in the first network infrastructure and to configure circuits in the second network infrastructure. The service provider network migration system includes at least one migration sequencing server to access one or more databases storing a provisioned circuits dataset including information for the plurality of circuits in the first network infrastructure, and a billing dataset including information for customers at the customer premises.

The migration sequencing server comprises a modeler and reconcilator generating a joined circuits dataset from the information in the provisioned circuits dataset and the billing dataset, and the joined circuits dataset associates each of the plurality of circuits in the first network infrastructure with at least one voice or data service provided by the circuit and a customer receiving the at least one voice or data service. A migration plan creator receives migration parameters for migrating the voice and data services from the first technology infrastructure to target services in the second technology infrastructure, the migration parameters including sequencing information for migration to the second network infrastructure providing the target services.

The migration plan creator creates a migration plan for migrating the plurality of circuits in the first network infrastructure to the circuits in the second network infrastructure based on the joined circuits dataset and the migration parameters, wherein the migration plan includes a sequence for migrating the plurality of circuits in the first network infrastructure to the circuits in the second network infrastructure.

A simulator determines forecasts for customer migration rate and revenue generation for the target services based on the migration plan, historic customer migration data and attributes of customers for the voice and data services provided in the first network infrastructure. If the migration plan is selected for implementation based on the forecasts, the inventory and provisioning server configures parameters for the circuits in the second network infrastructure via a network according to the migration plan to deploy the target services in the second network infrastructure.

According to an embodiment, a service provider network migration system migrate services from a first network infrastructure to a second network infrastructure. The system comprises one or more databases storing datasets. A joined circuits dataset associates each of a plurality of circuits in the first network infrastructure with a service provided by the circuit and a customer receiving the service. A product mappings dataset includes a mapping for each service in the first network infrastructure to at least one target service of a plurality of target services to be provided in the second network infrastructure. Legacy network migration records (LMARs) each include a customer information for a customer, any services subscribed to by the customer in the first network infrastructure, a circuit in the first network infrastructure providing each service subscribed to by the customer, a wire center including the circuit that services the customer, revenue information associated with revenue generated by the subscribed service, and at least of the target services mapped to each subscribed service.

At least one migration sequencing server comprises a modeler and reconcilator generating the joined circuits dataset; and a migration plan creator to receive migration parameters for migrating the services from the first technology infrastructure to the target services in the second technology infrastructure, the migration parameters including sequencing information for migration of the plurality of circuits in the first network infrastructure to the circuits in the second network infrastructure providing the target services. The migration plan creator creates a migration plan for to the target services provided via circuits in the second network infrastructure based on the joined circuits dataset, the product mappings dataset, the LMARs and the migration parameters, wherein the migration plan includes a sequence for migrating to the target services.

A simulator determines forecasts for customer migration rate and revenue generation for the target services based on the migration plan, historic customer migration data and attributes of the customers, wherein if the migration plan is selected for implementation based on the forecasts, an inventory and provisioning server configures parameters for the circuits in the second network infrastructure via a network according to the migration plan to deploy the target services in the second network infrastructure.

According to yet another embodiment, a method of migrating services from a first network infrastructure to a second network infrastructure includes determining a joined circuits dataset associating each of a plurality of circuits in the first network infrastructure with a service provided by the circuit and a customer receiving the service; determining a product mappings dataset including a mapping for each service in the first network infrastructure to at least one target service of a plurality of target services to be provided in the second network infrastructure; receiving migration parameters for migrating the services from the first technology infrastructure to the target services in the second technology infrastructure, the migration parameters including sequencing information for migration to the target services; creating a migration plan for migrating to the target services in the second network infrastructure based on the joined circuits dataset, the product mappings dataset, and the migration parameters, wherein the migration plan includes a sequence for migrating the plurality of circuits in the first network infrastructure to the circuits in the second network infrastructure; and determining forecasts for customer migration rate and revenue generation for the target services based on the migration plan, historic customer migration data and attributes of the customers. If the migration plan is selected for implementation based on the forecasts, configuring parameters for the circuits in the second network infrastructure via a network according to the migration plan to deploy the target services in the second network infrastructure.

BRIEF DESCRIPTION OF DRAWINGS

The embodiments of the invention will be described in detail in the following description with reference to the following figures.

FIG. 9 shows an example of scores generated for a migration plan.

DETAILED DESCRIPTION OF EMBODIMENTS

Figure 1A:
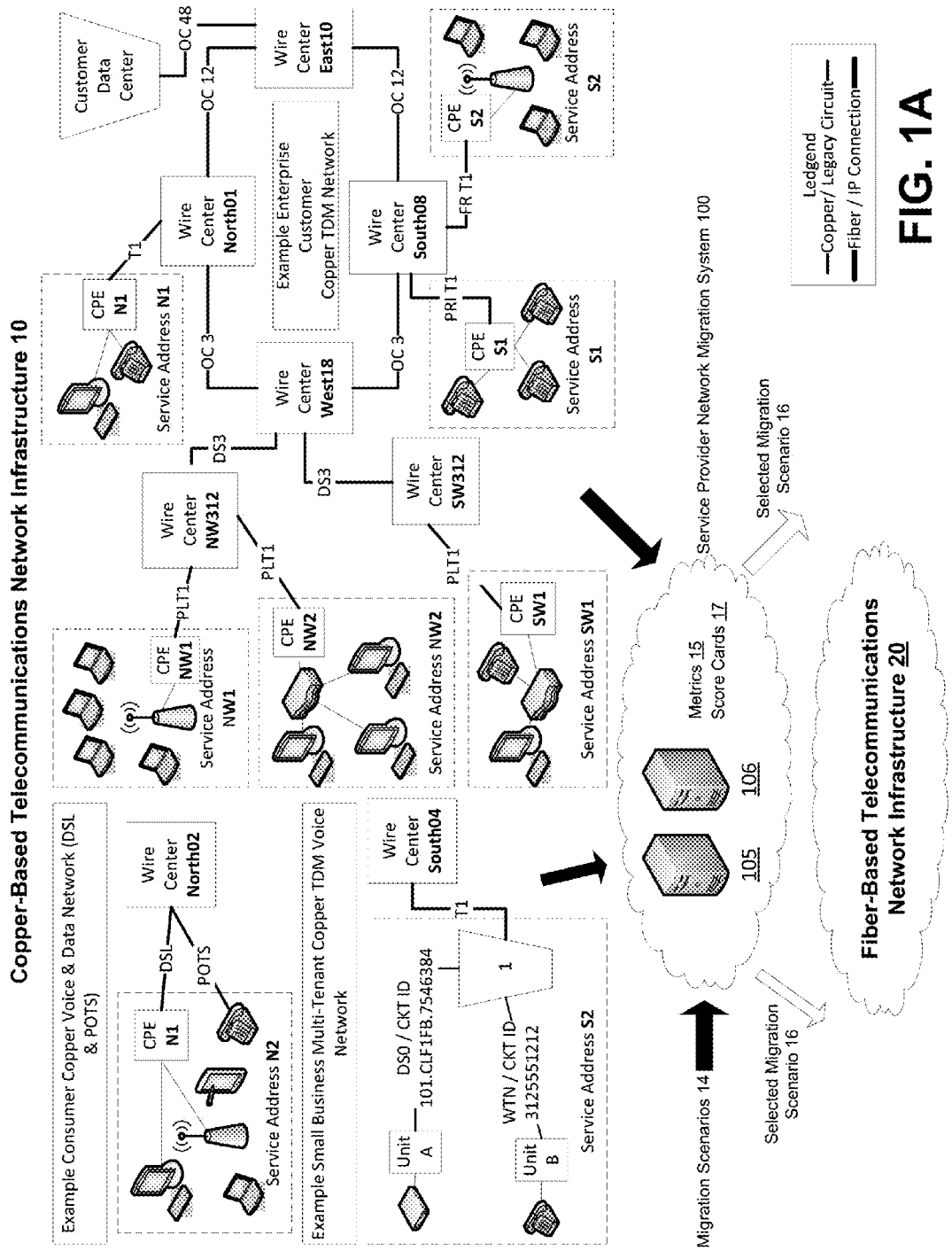
FIGS. 1A-B illustrate network infrastructures and a service provider network migration system migrating services from a first network infrastructure to a second network infrastructure, according to an embodiment.

For simplicity and illustrative purposes, the principles of the embodiments are described by referring mainly to examples thereof. In the following description, numerous specific details are set forth in order to provide a thorough understanding of the embodiments. It will be apparent, however, to one of ordinary skill in the art, that the embodiments may be practiced without limitation to these specific details. In some instances, well known methods and structures have not been described in detail so as not to unnecessarily obscure the embodiments.

According to embodiments, a service provider network migration system can simulate and analyze different communication network service deployments. The system may use the simulations and analysis to identify optimal service deployment scenarios in the network to maximize quality of service and satisfy customer demands as well as determine a rollout procedure to deploy network infrastructure and/or new services that minimizes service disruption and maximizes customer migration to the new infrastructures and services. Simulation may include generating a migration plan and determining forecasts and scoring for the migration plan. Furthermore, the system, for example, includes a network provisioning subsystem to provision circuits according to a network migration sequence determined from the simulations. Provisioning may include configuring circuits according to parameters determined from the simulation to provided needed bandwidth and accommodate quality of service (QoS) requirements for the services provided by the new network and minimizing downtime during the migration. According to an example, the provisioning subsystem may include distributed servers that determine and store configuration parameters determined based on a migration plan. Furthermore, the distributed servers may remotely set the parameters in the circuits in the target network infrastructure via a network.

Multiple technical problems may be solved by the embodiments described herein. For example, when migrating from a legacy network infrastructure to a target network infrastructure, the network service provider must determine whether the services currently provided on the legacy network infrastructure can be supported by the target network infrastructure, such as in terms of QoS and service level requirements for the services, and the service provider must determine other migration parameters. Through the simulation and analysis performed by the service provider network migration system, the system can determine a migration plan to deploy services in the target network infrastructure which minimizes service disruption for customers and maximizes customer migration to the new infrastructures, as well as accommodates QoS and service level requirements for the services deployed in the target network infrastructure. Another technical problem solved by the embodiments, is the configuration of circuits in the target network infrastructure. Typically, a network administrator may determine the circuit parameters through use of spreadsheets and estimates of customer demand, and then manually configure circuits which is highly susceptible to user error and can result in a service disruption for the customer. The provisioning subsystem can determines circuit parameters based on the simulation and remotely configure the circuits. Yet another technical problem solved by the embodiments is regarding the mapping of customers to existing circuits. In order to migrate customers to services on the target network infrastructure, an initial step to determining demand, such as in terms of bandwidth and/or other network parameters, in the legacy network infrastructure is to determine demand of each customer on a circuit. A service provider may determine the aggregate demand on a circuit, but often it is difficult to determine demand of a specific customer or service used by a specific customer on a circuit. The service provider network migration system can correlate data from the different sources and join the data into a single data set to run simulations and determine how to map existing services to new services to be provided on the new infrastructure.

A service as used herein may include the supplying or providing of information over a network, and is also referred to as a communications network service. Examples of services include but are not limited to any voice, data, cable or satellite television, streaming audio or video, etc., provided over a network.

Network infrastructure refers to the hardware and software resources of a network that enable network connectivity, communication, operations and management of a network. Network infrastructure provides the communication path and services between users, processes, applications, services and external networks which may include the Internet. Network infrastructure may include network hardware (e.g., routers, switches, network cards, wireless routers, cables, connectors, servers, etc.), network software (e.g., network operations and management, operating systems, firewall, network security applications, etc.) and communication mediums and protocols. One example discussed below includes simulations for a migration of services from a legacy network infrastructure comprising a copper wire telecommunication system to a target network infrastructure comprising a fiber optic system, and the rollout of services on the fiber optic system. However, the service provider network migration system may be used to simulate, analyze, and provide service rollout for services from any type of first network infrastructure (e.g., a legacy network infrastructure) to any type of second network infrastructure (e.g., target network infrastructure). The infrastructure may include wireless network infrastructure as well as wired network infrastructure. Legacy network infrastructure refers to an old or existing network infrastructure and legacy product and services refers to the services provided over the legacy network infrastructure. Target network infrastructure refers to a new network infrastructure being deployed and target product and services refers to the services to be deployed provided over the target network infrastructure. Customers are migrated from the legacy services to the target services.

The service provider network migration system includes scenario-based simulation to simulate different scenarios encompassing different changeable parameters or variables for services and network infrastructure to be deployed. The system may include a multi-linear simulator capable of running simulations for different scenarios. The output of the simulator includes an analysis of each scenario and an analysis of business and technology sub-solutions for each simulation. A solution includes an analysis of different factors for deploying a service given changeable parameters, constraints, and existing service parameters, if any. Sub-solutions provide an analysis of different categories of the factors. For example, a business sub-solution includes an analysis of business factors. A technology sub-solution includes an analysis of technology factors, etc. For example, a solution or sub-solution may include an analysis of the complexity of a network migration, number of circuits, productivity of the workers, costs, profits, customer impact, QoS parameters and other factors. The simulations are operable to take into consideration existing implementations of infrastructure, operations and services, and can be used to evaluate the impact on the existing services when migrating customers to services on the target network infrastructure.

Through its simulation and analysis, the service provider network migration system is able to determine optimal sequencing and timing for migrating customers to the new infrastructure. For example, a legacy infrastructure may have customers on many different circuits, and the service provider needs to determine how to migrate the customers to the new infrastructure while taking into consideration customer constraints on timing, QoS, etc. Because customers may be on many different circuits, the service provider network migration system allows the user to slice, dice and select which circuits to move together, taking into consideration various parameters. For example, the service provider network migration system can determine which wire centers to move first so as to minimize the down time and the disruption caused by the network migration, and also determine how much revenue the service is going to generate from the migration, and what are the expenditures.

For example, in the context of migrating from a copper infrastructure (e.g., legacy network infrastructure) to a fiber optic infrastructure (e.g., target network infrastructure) for telecommunication services, there may be multiple circuits of different types currently servicing customers. The service provider network migration system may group the circuits by type of circuit, customer, products, wire center, etc. Approaches and processes for initial discovery, analysis, and execution of migration are determined to generate a migration plan to determine the sequencing for disconnecting customers from the copper circuits and re-connecting them to fiber nodes in the new fiber optic infrastructure and determining other procedural steps including the last step of salvaging of the copper. The sequencing for example is based on the underlying technologies, the customers, the legacy services, the available target services and the availability of new target network infrastructures.

The service provider network migration system may utilize data from a variety of different sources to simulate and analyze different sequences for migration. For example, service providers often have separate data for billing, network inventory, network element provisioning, customer service records, contract and data describing how the current infrastructure is being used and is allocated to customers. The service provider network migration system can correlate the data from the different sources and join the data into a single data set to run simulations and determine how to map existing services to new services to be provided on the new infrastructure. Furthermore, the service provider network migration system can generate models for the simulation engine. The models may include variables representing customers, services and infrastructure. Constraints for migration and providing services, and the models may be used by the simulation engine for forecasting in order to determine optimal sequencing for migration and service roll-out. Optimal sequencing may minimize down time and disruption, provide the maximum quality of service, minimize customer loss and maximize profitability for the service provider.

Figure 1B:
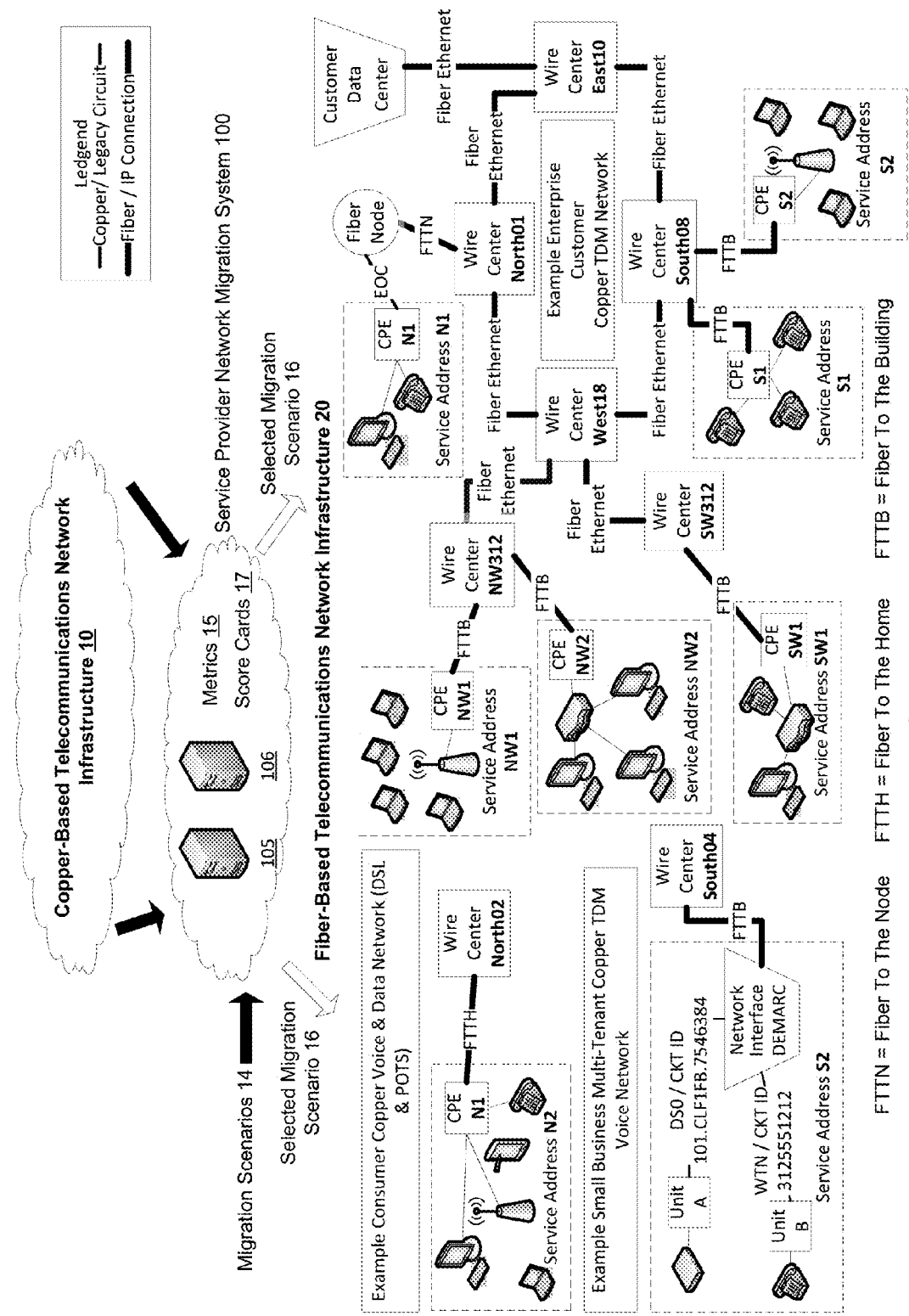

FIGS. 1A-B show a copper-based telecommunications network infrastructure 10 and services that are migrated to an IP fiber-based telecommunications network infrastructure 20. FIGS. 1A and 1B are the same except FIG. 1A shows details of the legacy copper-based telecommunications network infrastructure 10 and represents the IP fiber-based telecommunications network infrastructure 20 as a cloud, and FIG. 1B shows details of the IP fiber-based telecommunications network infrastructure 20 but represents the copper-based telecommunications network infrastructure 10 as a cloud. The cloud representations of the network infrastructures 10 and 20 shown in FIGS. 1B and 1A respectively are meant to represent the detailed diagram of the corresponding network infrastructure shown in one of the FIG. 1A or 1B. A service provider network migration system 100 can generate metrics 15 for evaluating candidate migration plan scenarios 14 for the migration of services from the copper-based telecommunications network infrastructure 10 to the fiber-based telecommunications network infrastructure 20. Score cards 17, which are further described below, evaluate and score candidate migration plan scenarios based on the metrics 15. One scenario 16 may be selected based on the metrics 15 and score cards 17 that may be used to ascertain an optimal sequencing for migration and service roll-out that minimizes down time and disruption, provides the capacity (e.g., bandwidth) for desired services, provides the maximum QoS and/or maximizes profitability for the service provider. The selected scenario 16 may be implemented for the fiber-based telecommunications network infrastructure 20 and an example of the fiber-based telecommunications network infrastructure 20 that is implemented is described below and shown in FIGS. 1A-B.

Generally, the copper-based telecommunications network infrastructure 10 for example includes circuits in a circuit-switched network. For example, when a call is made for a voice service, circuits within telephone exchanges create a continuous wire circuit between the two telephones, for as long as the call lasts. The telephone exchanges are located in central offices that service different geographic regions. The copper-based telecommunications network infrastructure 10 may predominately use copper lines instead of fiber lines for circuits between wire centers and customer premises. A wire center may encompass the central office, hardware located inside and outside the central office and connections from the central office to the customer service address, which is the geographic address of the customer premises, such as house/building number, street, city, etc. A circuit may include a path between two points or terminals in a network infrastructure for communicating signals. The circuit may comprise the equipment including switches, wires, etc.

Referring to FIG. 1A, the copper-based telecommunications network infrastructure 10 includes, for example, an enterprise customer copper time-division multiplexing (TDM) network 11, a consumer copper voice and data network (e.g., digital subscriber line (DSL) and plain old telephone service (POTS)) 12, and small business multi-tenant copper TDM voice network 13. The enterprise customer copper TDM network 11 for example, includes multiple wire centers connected to a customer data center. The wire centers may be connected in a fiber loop but may not use IP for communications. "OC" which is shown in the connections between the wire centers and in the connection between the wire center and the data center refers to optical carrier transmission rates. Also, wire center West 18 is connected to wire centers NW312 and SW312 via a digital signal level 3 (DS3) line, which is also referred to as a T-3 line. The wire centers are connected to customer premises equipment (CPE) at the service address of the customer (i.e., at the customer premises) via copper lines which may be T1 lines.

For the consumer copper voice and data network 12, for example, the wire center is connected to the CPE via copper DSL or POTS lines. For the small business multi-tenant copper TDM voice network 13, for example, the wire center is connected to CPE at the service address via a T1 line. At the CPE, network element 1 is shown that provides data and voice services, and examples of circuit identifiers (IDs) are shown for the data and voice circuits.

As discussed above, the system 100 may select the migration scenario 16 from a plurality of candidate migration scenarios 14 to implement. The selected migration scenario 16 is for the fiber-based telecommunications network infrastructure 20. The circuit-switched network of the copper-based telecommunications network infrastructure 10 is contrasted with a packet switched network that is implemented in the fiber-based telecommunications network infrastructure 20. The packet switched network for example uses IP, and the fiber-based telecommunications network infrastructure 20 implements broadband services primarily over fiber instead of copper. So, copper lines may be replaced with fiber optic lines connected to fiber nodes and digital switches instead of voice circuits. Fiber may be run to a node for a neighborhood or region and then copper may be used for a short distance to the service address or fiber may be run to the service address. As shown in FIG. 1B, FTTN=Fiber To The Node; FTTH=Fiber To The Home; and FTTB=Fiber To The Building. Furthermore, new services are offered on the fiber-based telecommunications network infrastructure 20 to replace the services previously offered on the copper-based telecommunications network infrastructure 10. For example, voice-switched services are replaced with IP services in the fiber-based telecommunications network infrastructure 20. For example, a voice service provided over a circuit-switched architecture is replaced with voice over IP (VoIP) service in the infrastructure 20. In another example, a legacy data service is replaced with a broadband data service in the infrastructure 20 that provides higher download and upload bandwidths. For example, new digital circuits are provisioned in the infrastructure 20 to provide the IP services that bypass circuit-switched hardware of the legacy infrastructure 10. As is further described below, legacy services are mapped to the new services (referred to as target services) to be rolled out on the infrastructure 20 (e.g., the target infrastructure).

As shown in FIG. 1B, the fiber-based telecommunications network infrastructure 20 for example includes enterprise customer network 21, consumer voice and data network 22, and small business multi-tenant network 23. The enterprise customer network 21 uses fiber Ethernet to connect the wire centers and to connect to the data center. FFTN, FTTB, and FTTH are used to connect to fiber nodes and CPE at the service address. "EOC" refers to Ethernet over copper which may be used on copper runs from the fiber node to CPE at service addresses. The consumer voice and data network 22 may use FFTH to connect the wire center to the CPE at the service address, and the small business multi-tenant network 23 may use FTTB to connect the wire center to the multi-tenant building.

The service provider network migration system 100 may be executed by one or more servers. Servers 105 and 106 are shown but the system 100 may be implemented by one server or more than two servers. Servers 105 and 106 are further described below. In one example, the service provider network migration system 100 comprises a plurality of distributed computer systems. The distributed computer systems may include servers for executing simulations to determine candidate migration plans, and one may be selected as the migration plan 16. The distributed computer systems may include servers to extract, transform and load billing, inventory and provisioning data into the system 100 which may be used for the simulations, optimization and provisioning of services in the target network infrastructure. The distributed computer systems may include servers for monitoring and capturing network parameters, including bandwidth, latency, etc. Also, the distributed computer systems may query the network hardware to determine addresses, such as media access control addresses and IP addresses of hardware devices in the network infrastructures and other configuration parameters. This information may be mapped to the network parameters and stored to specify the network parameters for specific devices in the network infrastructure. The distributed computer systems may also include a provisioning system to configure hardware devices, for example, in the target network infrastructure. An inventory and provisioning servers 105 may remotely perform discovery and capture network parameters of existing switches via a network in the infrastructure 10 and remotely configure circuits in the infrastructure 20 via a network. Also, a migration sequencing server 106 may determine migration plans and execute simulations to score migration plans to determine optimal migration plans to implement for migrating to the infrastructure 20. The inventory and provisioning server 105 may include one or more servers, and the migration sequencing server 106 may include one or more servers.

Figure 2:
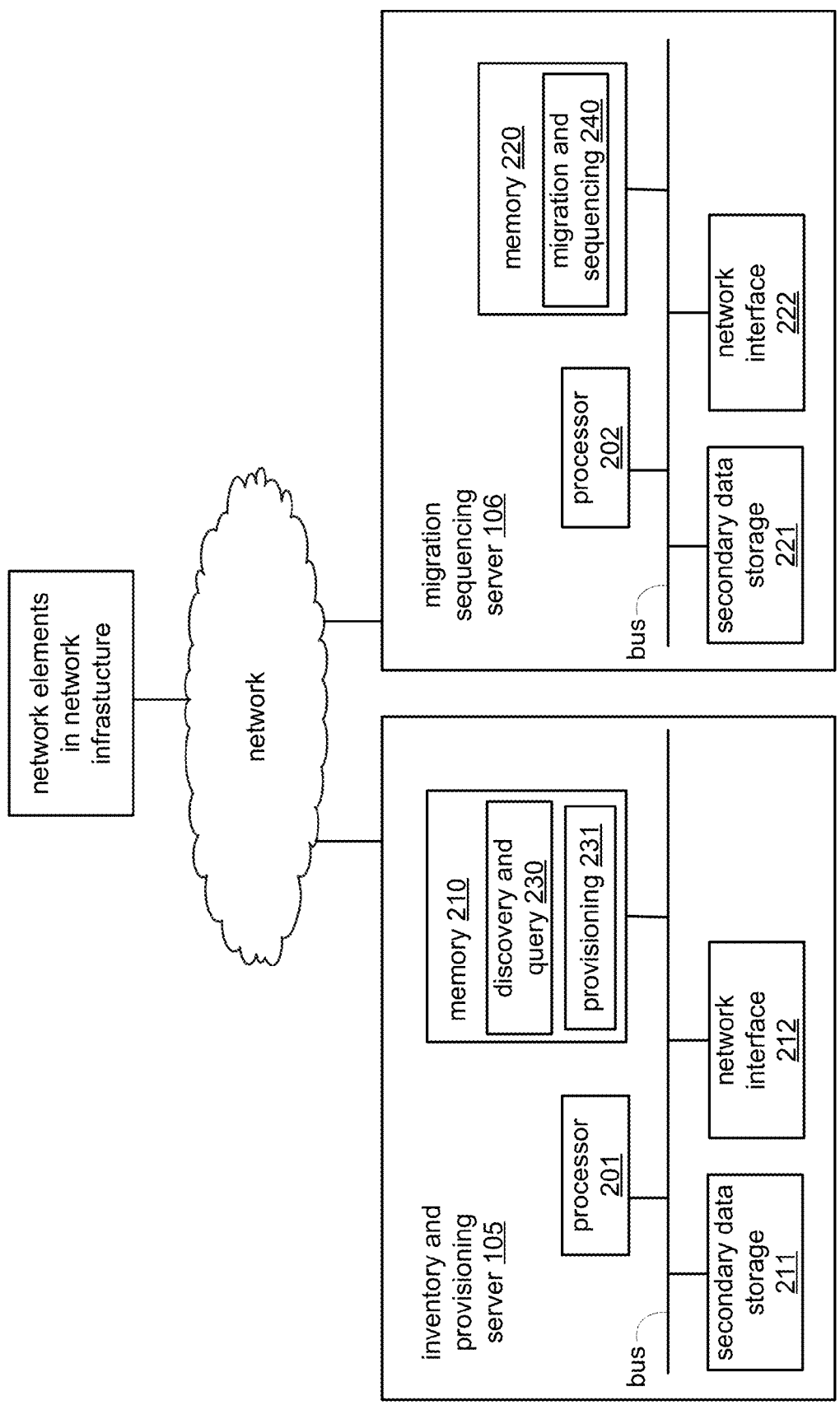
FIG. 2 illustrates servers for the service provider network migration system, according to an embodiment.

FIG. 2 shows an example of the inventory and provisioning server 105 and the migration sequencing server 106. The inventory and provisioning server 105 can remotely perform discovery to identify network elements in the network infrastructure, such as the copper-based telecommunications network infrastructure 10 and the fiber-based telecommunications network infrastructure 20 after it is deployed. Also, the inventory and provisioning server 105 can query network elements in the network infrastructure to capture network parameters for the network elements, and the inventory and provisioning server 105 can provision network elements by remotely configuring network elements via a network. Network elements include hardware in the network infrastructure.

Hardware is shown for the servers 105 and 106 which may be used as a platform for executing one or more of the methods and functions described herein. The methods and functions may be embodied as software stored on one or more non-transitory computer readable storage mediums. The servers 105 and 106 may each include one or more hardware processors 201 and 202 that execute machine readable instructions for the software. The servers 105 and 106 also include main memory 210 and 220, such as a random access memory (RAM), where the software and data for processors 201 and 202 reside during runtime, and secondary data storage 211 and 221, which may be non-volatile and store software and data. The memory and secondary data storage are examples of non-transitory computer readable storage mediums that may be included in the servers 105 and 106. The servers 105 and 106 include network interfaces 212 and 222 for connecting to network elements and other servers and computer systems via a network. The network elements may include equipment shown in FIGS. 1A-B for the network infrastructures 10 and 20. It will be apparent to one of ordinary skill in the art that the severs 105 and 106 may include other known components that are not shown.

As shown, the inventory and provisioning server 105 may store and execute software 230 for discovery and query of network elements in a network infrastructure via a network. A legacy network data capture subsystem 140 shown in FIG. 3A may be implemented by software 230. The software 230 may send queries to network elements in the network infrastructure to identify network elements and determine network parameters for the network elements. The parameters may include port information, circuit IDs for each port, network address information, service information, etc. This information is stored in a data storage for the system 100 and used to determine the services provided by each circuit. Also, the network elements may be queried to determine information related to the quality or a health of network element and generate alerts to network administrators if a network element is determined to be failing or operating in error.

Software 231 for provisioning network elements may be stored and executed by the server 105. A network provisioning subsystem 141 shown in FIG. 3A may be implemented by the software 231. Provisioning may include setting network parameters for network elements remotely via a network so the network elements perform the desired functions in the network infrastructure. In one example, a software defined networking (SDN) protocol is used to set network parameters. The software 231 may include a rich set of application program interfaces (APIs) that manage and manipulate network elements. The network elements may include software modules that can be remotely configured by the server 105 to perform the desired functions and desired network parameters are set in the network elements, which may include automated provisioning of network addresses, assigning specific QoS and latency parameters, etc.

The migration sequencing server 106 may include migration and sequencing software 240. The software 240 may include software for performing stages 110, 120 and 130 described in further detail with respect to FIG. 3A. The servers 105 and 106 may be connected via one or more networks to each other and equipment in the infrastructures 10 and 20.

Figure 3A:
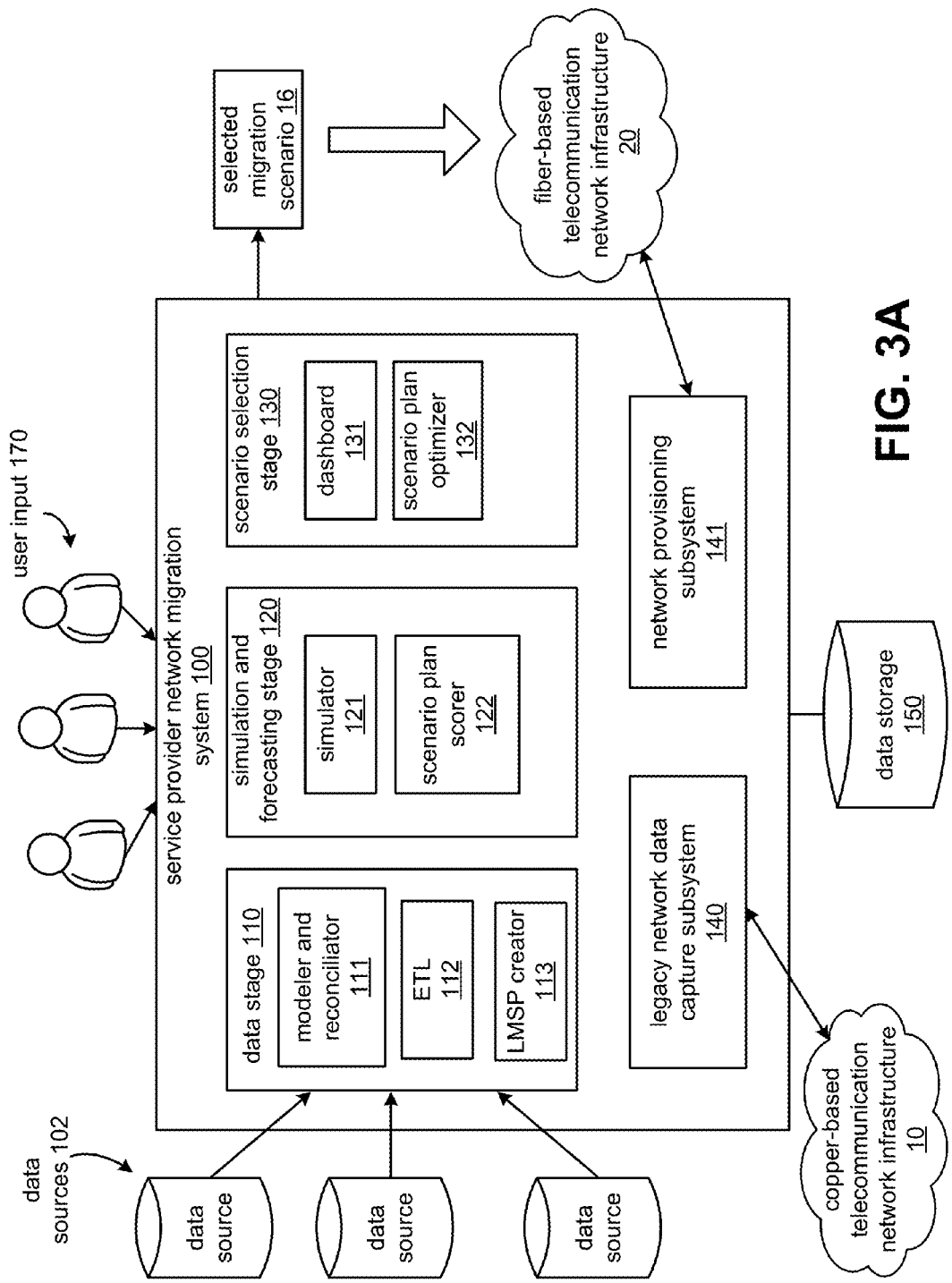
FIG. 3A illustrates a block diagram of the service provider network migration system, according to an embodiment.

FIG. 3A shows a logical representation of the system 100 including functional blocks but it will be apparent to one of ordinary skill in the art that the system 100 may be comprised of hardware and/or software which includes machine readable instructions stored on a non-transitory computer readable medium and executable by at least one processor to implement the stages.

Data stage 110 receives data from one or more data sources 102 and user input 170. The data sources 102 may include the user's internal data sources, such as data sources of a service provider identifying customer information, billing information, network infrastructure information, etc. The data sources 102 may include external data sources, which provide this information and/or other information. The other information may include information for the simulation engine to forecast variables related to migration of services. External data sources may include commercial organizations or databases or government agencies that provide information on service usage and regulations, constraints for implementing services, service address standardization, service address geo-coding, customer demographics and competitive service overlays. The data sources 102 may include multiple billing and accounting systems, network element inventory and tracking systems, customer relationship management systems, etc.

The data stage 110 may include a modeler and reconciliator 111, an extract, transform and load (ETL) module 112, and a Legacy Migration Scenario Plan (LMSP) module 113. The modeler and reconciliator receives data from the data sources 102 and user input 170, and the data is aggregated to create models for simulating and forecasting in a simulation and forecasting stage 120. The models may include customer models, product models and network models. In one example, the models are data sets including attributes describing the customers, services and network infrastructure. In one example, a service provider's disparate product, customer, billing and network datasets are aggregated into a Legacy Network Migration Analytic Record (LMAR), which may include the customer model, the product model and the network model. A product for example is a service that is offered to a customer. Once implemented (e.g., the customer orders a product and it is provided to the customer), the product is referred to as a service. Legacy network migration specific data may be added to the LMAR by the user input 170, data linking of additional datasets, templates, machine prediction or other means. The legacy network migration specific data may include but is not limited to, costing parameters, segmentation groupings, sequencing information and sizing data, investment data, network inventories, customer demographics data, competitive overlay data, contract data, etc. The LMAR may be updated over time based on newly received data.

The modeler and reconciliator 111 performs reconciliation. Reconciliation may include associating network assets, product information, customer information, and billing information and storing the associated information in a data structure. Reconciling includes associated the billing information with network assets determined to provided services identified by the billing information. For example, a customer and a service used by the customer are linked to a specific circuit in the copper-based telecommunication network infrastructure 10 from billing information for that service. It links the network asset (i.e., the circuit) and the customer and the service provided by the circuit to the customer. The wire center including the circuit may also be linked. This reconciliation provides a correlated view for simulating, planning and executing the network migration. In one example, reconciliation may be based on a working telephone number for voice circuits or a circuit ID for digital circuits as is further explained below.

The ETL 112 for example extracts data from the data sources 102 and user input 170. The extraction may include receiving data pushed and/or pulled from the data sources 102 which may be in the LMAR. This may include retrieving data from the data sources 102 and/or periodically receiving data from the data sources 102 that is pushed to the system 100. Furthermore, each data source may also use a different data organization structure and/or format. Such data sources may include relational databases and flat files, but may also include non-relational database structures. The extraction extracts and parses the data into a format for the transformation process.

The transformation process may apply rules and/or functions to the extracted data, to prepare the data to be loaded into data storage 150. The data storage 150 may store any information used by the system 100 and may comprise one or more databases. The requirements for the transformation process may be a function of the extracted data and the ultimate form of the data stored in the data storage 150. Such transformation rules and functions may include selecting certain fields, translating coded symbols, encoding new symbols, calculating values, merging sources, etc.

The load process loads the transformed data into the data storage 150. The data may be loaded into a data structure, such as a database or flat file. The loaded data may overwrite old information with new data and may maintain a history and audit trail of all changes to the database.

In one example, the ETL 112 formats, transforms the data into Legacy Network Migration Analytical Records (LMARs) for analysis and scenario planning purposes. The LMARs may be used for the customer, product, network, scenario parameters, migration sequencing information, and sizing data needed for legacy network migration analysis, forecasting, scoring and predictive modeling. The LMARs may be saved in the data storage 150 and loaded into system memory as a virtual flat table for fast query processing.

The LMSP creator 113 can aggregate existing carrier product, customer, billing and network datasets with additional migration specific costing, sequencing, sizing, investment, and inventory data, which may be provided as part of the user input 170, to generate migration plans, such as the LMSPs.

LMSPs may be selected for different types of planning, such as Customer-Product Scenario Planning, Labor Sizing Scenario Planning, Sequencing Scenario Planning, and Salvage and Operating Savings Scenario Planning. Also, different approaches may be applied to different types of planning. LMSPs and the different approaches are further described below.

A simulation and forecasting stage 120 may include a simulator 121 and a scenario plan scorer 122. The simulator 121 runs simulations from different migration plans (e.g., LSMPs) and the LMARs to determine metrics analyzing the migration plans. The metrics generated from the simulations may include predictions of the outcomes for implementing an LMSP to migrate to the new infrastructure. For example, monthly and quarterly legacy product disposition, migration revenue impact, migration subscriber impact, network investment, migration cost, labor headcounts, salvage recovery and earnings before interest, taxes, depreciation, and amortization forecasts are generated. The simulation results may be visualized graphically and as tabular data in a dashboard 131 and may include time series forecasts of the metrics. The dashboard 131 may include a graphical user interface.

The scenario plan scorer 122 scores the simulated migration plans based on the metrics generated by the simulation engine 121. In one example, the scenario plan scorer 122 uses the simulation results to generate a score card for a migration plan. The scoring card may be visualized in the dashboard 131 for review by the user. Individual migration plans are compared and ranked against each other via the scoring matrix, allowing the user to quickly compare migration plans. The scenario plan scorer 122 can score scenario plans using time independent scoring metrics or by using system-generated time series forecasts from the simulations to calculate the Net Present Value (NPV), rate of return, and the estimated return on investment (ROI) of the migration plan. The migration plan is scored by multiple dimensions or metrics including: customer impact, complexity, size, productivity, capital investment, reoccurring revenue, onetime expense, onetime salvage recovery and reoccurring savings. Each migration plan can have a single aggregate score assigned to it. One or more of these metrics is forecasted and the score is determined from the forecasts. The migration plan score is calculated using all of the individual scores for the metrics.

A scenario selection stage 130 may include the dashboard 131 and a scenario plan optimizer 132. The scenario plan optimization engine 132 may identify the optimum migration plan 140 from the scoring, user goals, constraints, etc. A migration plan can be quickly refined and optimized by changing scenario scope, constraints, parameters, and/or approach and then re-running the simulation and scoring.

The scenario plan optimizer 132 automatically optimizes a migration plan by setting an optimization objective. Optimization objectives may include: minimize customer impact, minimize cost, minimize time, maximize revenue, and maximize return on investment. A plurality of migration plans may be simulated and forecasts for each migration plan are determined. A score for each migration plan is determined based on the forecasts. The migrations plans are compared based on their scores, and the dashboard 131 can display the scores and can display information for the migration plans that prioritizes the migration plans based on their scores.

The dashboard 131 may display the metrics, scores, comparisons, etc., and facilitate drill downs into the output of the simulations to provide detailed data about simulated migration plans to the user. The dashboard 131 can provide analytic views for scenario product planning, wire center or individual customer migrations. The views can be linked directly to the LMARs and users can interact with the views (e.g., drill downs) to understand and gain insights into the underlying customer, product and network data.

Figure 3B:
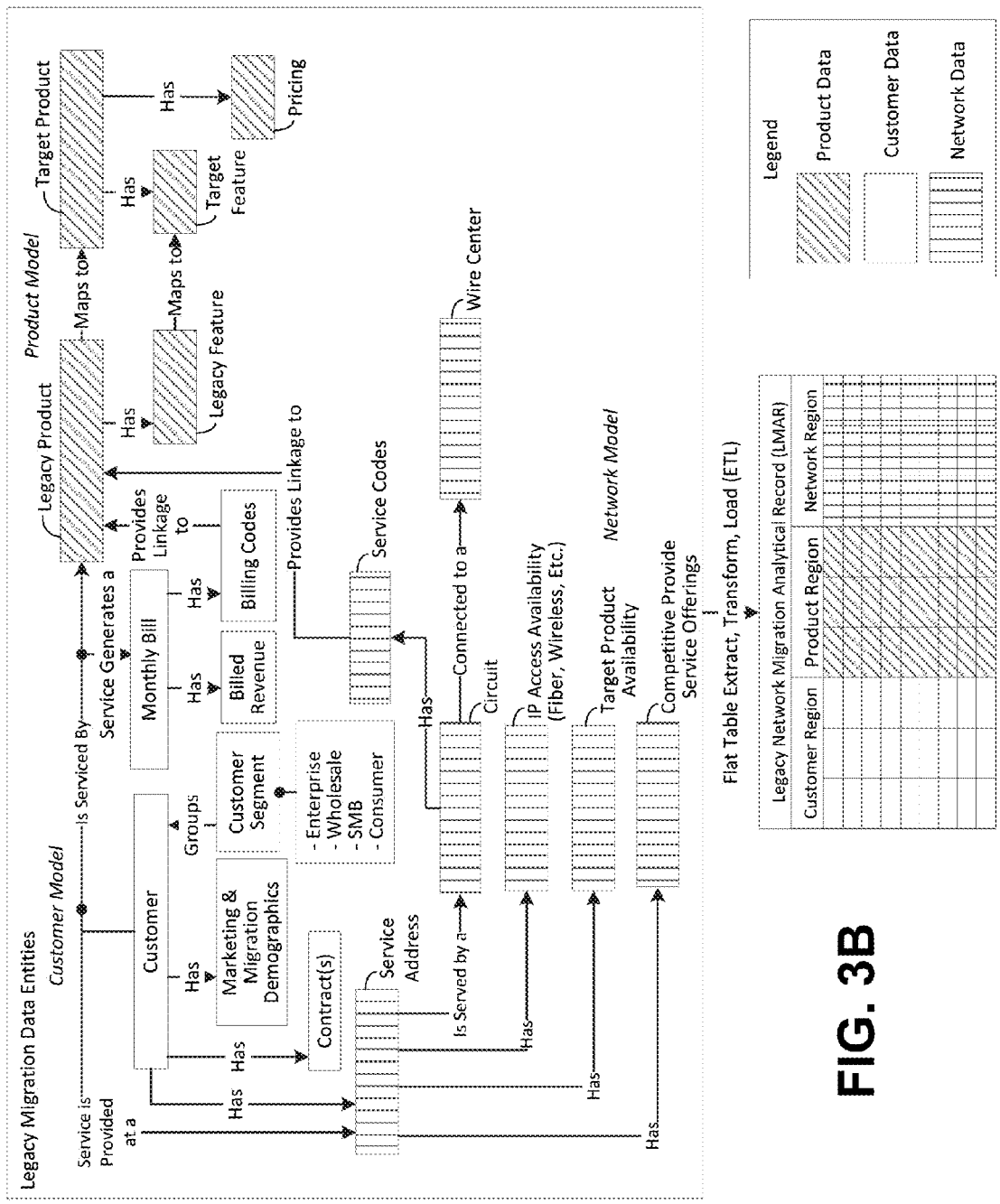
FIG. 3B shows a data model of a legacy network migration analytical record, according to an embodiment.

FIG. 3B shows data that is an LMAR. As shown in FIG. 3B, legacy migration data entities may include a customer model, a product model and a network model and information in these models are included in the LMAR. The models show the types of information in the LMAR and how the information is associated. The LMAR includes customer data from the customer model, such as customer segment (e.g., enterprise, wholesale, small business (SMB) or consumer), service address, contract information, marketing and migration demographics, which include customer demographics and may be used to determine a customer's propensity to migrate and competitive overlays, etc. The customer model also include billing information, such as the monthly bill, billed revenue and billing codes that identify legacy products that are billed to the customer. The network model identifies the service address of the customer, and the circuit and wire center that services the customer. Also, for the service address, IP access availability, target product availability and completive provider service offerings are included in the network model. Also, the network model includes service codes for the circuit, and the service codes identify the legacy products subscribed to by the customer. The product model include the legacy products subscribed to by the customer. The legacy products are identified by the billing codes and service codes and this information is used for reconciliation. The legacy products and their features and the corresponding target products and features that map to the legacy products and their features are included in the product model. Also, pricing of the target products are included. The information shown in FIG. 3B may be flattened and loaded into an LMAR table as shown in FIG. 3B. The LMAR table stores LMARs for each customer.

Figure 4:
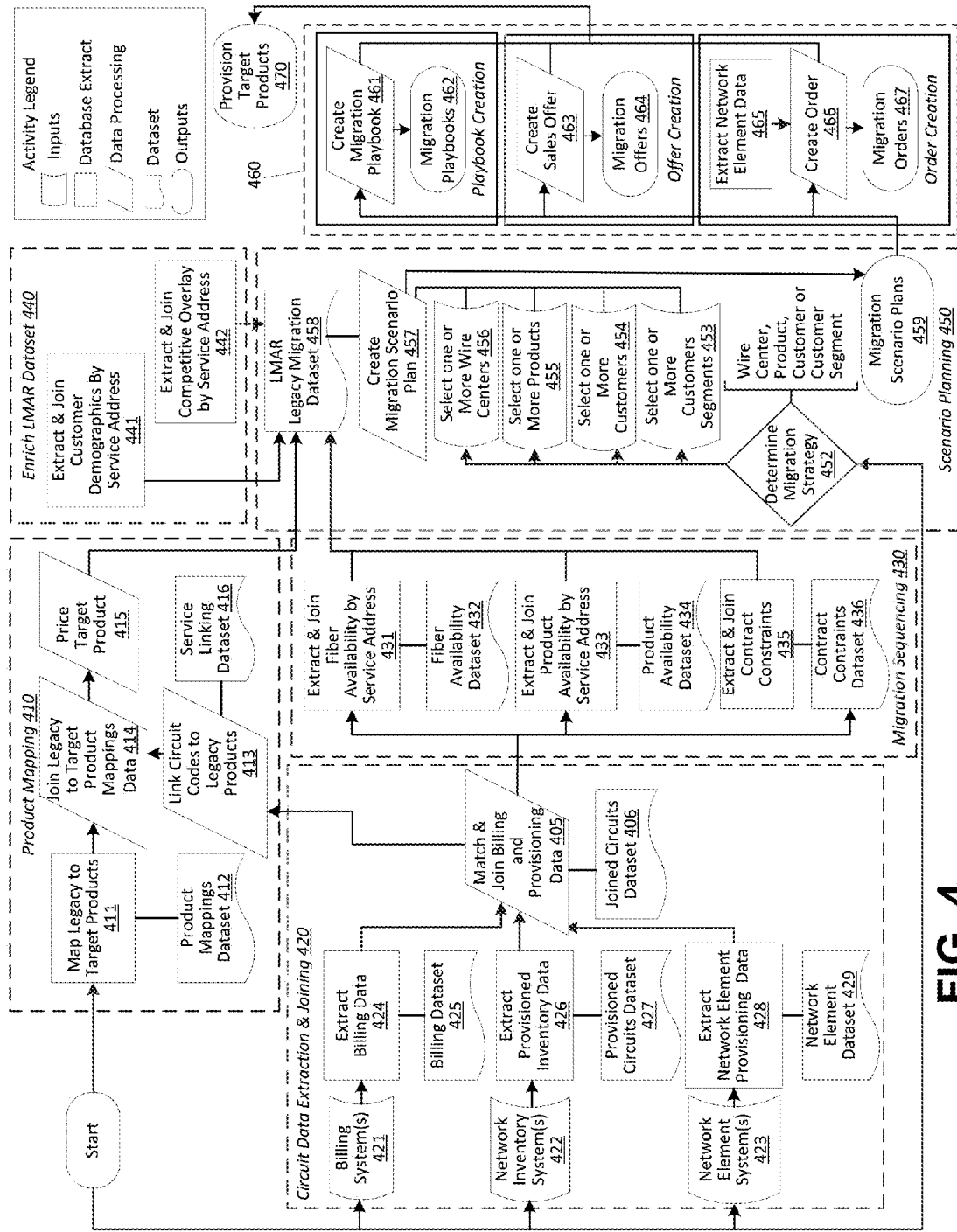
FIG. 4 illustrates a data flow diagram for the service provider network migration system, according to an embodiment.

FIG. 4 shows a data flow diagram, including data processing steps, inputs, outputs, database extracts, and datasets, for the service provider network migration system 100. The data flow includes product mapping at 410, circuit data extraction and joining at 420, migration sequencing at 430, LMAR dataset enrichment at 440, scenario planning at 450, and migration playbook creation, offer creation and order creation at 460. For product mapping at 410, the system 100 stores a mapping of legacy products to target products at 411. The stored mappings are shown as product mappings dataset 412. A legacy product may map to multiple target products offered in the target infrastructure. For example, in the copper-based telecommunication network infrastructure 10, a legacy data service was provided to customers over a T1 line at 1.5 megabits per second (Mbps). Three different data products offered on the fiber-based telecommunication network infrastructure 20 are mapped to the legacy data service. For example, target products in the fiber-based telecommunication network infrastructure 20 may include the following: one data product may include 10 Mbps download and 5 Mbps upload; a second data product may be provide managed 100 Mbps download bandwidth and a third data product may be 500 Mbps. Each data product may have different pricing, such as $30.00 per month for the first data product, $100 per month for the second data product, and $500.00 per month for the third data product. The mapping information in the product mappings dataset 412 may include the pricing information. For the mapping, products may be grouped by circuit, service type, etc. The product mappings for the product mappings dataset 412 may be entered by a user and stored in the data storage 150 shown in FIG. 3A.

Once the product mappings dataset 412 is created and stored, it can be used to map a specific legacy product to one or more particular target products in the target infrastructure. For example, at 413, the system 100 links the circuit service codes to the legacy products currently being provided to a set of one or more customers. The service codes identify which legacy products are being provided by each individual circuit in the joined circuits dataset 406. A unique set of service linking codes may be stored in the service linking dataset 416. The system 100 determines the legacy products corresponding to the circuit service codes from the product mappings dataset 412 at 413. At 414, the system 100 joins legacy products with corresponding target products based on the product mappings dataset 412. The pricing information may be stored in the product mappings dataset 412 and is applied to the target products at 415. An LMAR is created at 458, and the target products and their pricing are stored in the LMAR along with other information, such as described with respect to FIG. 3B. If more than one target product maps to a legacy product, then multiple target products are stored in the LMAR.

The circuit data extraction and joining 420 shown in FIG. 4 may include reconciliation performed by the system 100. For example, the circuit data extraction and joining 420 and the product mapping 410 may be performed by the modeler and reconciliator 111 shown in FIG. 3A.

Billing data, provisioned circuit data and network element data are extracted from the data sources 421, 422, and 423 to create corresponding datasets 425, 427 and 429. The information may be extracted periodically from the data sources 421, 422, and 423 for the datasets 425, 427 and 429. The billing dataset 425 includes information from a customer invoicing enterprise application and include customer information, such as a customer ID, customer service address, services the customer is paying for, service constraints, disconnect dates, a working telephone number, a data circuit ID, etc. The provisioned circuits dataset 427 includes information for circuits that are currently provisioned in the legacy infrastructure. This information may identify the services currently implemented by the circuit and may identify a working telephone number or a data circuit ID for the services and the service address where the circuit terminates at specific geographic location (e.g., the location of the customer), but the information typically does not identify the customer associated with a particular service currently implemented by the circuit. The information may also include other circuit information, such as speed, class of service, etc. This information may be entered and maintained by network administrators. The network element dataset 429 includes information about network elements in a wire center including equipment inside a central office and outside a central office running to the customer premises. The network elements may be queried to get this information.

At 424, 426 and 428, billing data, provisioned circuit data and network element data are extracted from the corresponding datasets to create joined circuits dataset 406. For example, billing data, provisioned circuit data and network element data for a particular customer or for a particular product or wire center in the legacy infrastructure 10 is extracted. The retrieved data is joined to create joined circuits dataset 406. A common field in the retrieved data may be used to join the retrieved data. For example, working telephone number for a voice service or digital circuit ID for a data service may be common fields between billing data and circuit data. For example, in the joined circuits dataset 406, a customer is associated with a circuit and a wire center providing a service for the customer. Then, this information may be used to migrate the customer to a corresponding new service, such as described with respect to product mapping 410, and to migrate the customer to a new circuit in the target infrastructure providing the new service. Typically, service providers do not connect or fully understand the related underlying data for the circuits and network elements that are supporting the services that a particular customer is being billed for. The joined circuits dataset 406, however, links the customer, service and circuit information, which is used for developing a migration plan.

The migration sequencing 430 determines availability of network infrastructure and new products in the target infrastructure for migrating services to the target infrastructure. For example, fiber availability dataset 432 indicates when fiber will be available at a node or at a customer premises. Installation of fiber for the target infrastructure is scheduled and the schedule is used to determine the availability of the fiber. Product availability dataset 434 indicates when the new products are estimated to be available in the target infrastructure. Contract constraints dataset 436 identifies customer contract service constraints, which may include service level agreements. At 431, 433 and 435, information is retrieved from the corresponding datasets 432, 434 and 436 to determine when a legacy service can be migrated to a new product. This information is determined for the target products determined at the product mapping 410 and stored in the LMAR dataset 458. For example, at 431, a service address of the customer is known, and from the fiber availability dataset 432, a determination is made as to when a fiber transport for a corresponding IP service mapped to the legacy service is available. Similarly, at 433, a determination is made as to when the corresponding IP service is available and at 435 a determination is made as to whether the contact constraints can be met by the IP service.

The LMARs may include a variety of information for determining the migration plan. An LMAR may include a service address, legacy product, mapped target products, pricing, availability of transport, availability of target products, contact constraints, customer demographics, competitor information etc. This information may be used to generate migration plans and score cards for the migration plans. LMARs are created and stored in LMAR legacy migration dataset 458.

The datasets shown in FIG. 4 are used to determine a migration plan and other information. For example, at 452 in FIG. 4, a migration strategy is determined. A migration strategy specifies segregation for service rollout in the target infrastructure. A customer approach, circuit approach, etc., may be selected for the migration strategy. Service rollout for example is the provisioning of services for customers in the target network infrastructure according to a sequence determined based on the migration strategy as specified in the migration plan. By way of example, migration strategy may be a migration to be executed by wire center, by product, customer segment or by customer. In one example, the user input 170 may include a selection of the migration strategy.

At 453-456, a user may select a set of one or more wire centers, products, customer segments or customers to migrate. For example, if a wire center approach is used, one wire center or multiple wire centers may be selected. Depending on the determined migration strategy, which may be by wire center, by product, by customer segment or by customer, a set of one or more wire centers, products or customers is selected. At 457, the system 100 generates queries on the LMARs to create a migration plan according to the migration strategy. To create LMARs, at 441 Customer Demographics By Service Address is extracted and joined with other LMAR data. Also, at 442, competitor service information is included to determine number of competitors that can provide services at the service address to estimate the customer propensity to migrate for the migration rate and it may be used to determine or modify pricing for offers.

The circuit data extraction and joining performed at 405 can be used for capacity planning and QoS optimization and for revenue optimization for the migration plan. In one example, the billing information, circuit information and network information for all the circuits, customers and products are previously joined at 405 and stored in the jointed circuits dataset 406, and then the data is queried according to the queries created at 4457 to slice, dice and select the data by customer, product or wire center. The data in the joined circuits dataset 406 correlating customers with circuits can be used to provide an indication of how important a particular circuit is to a customer in terms of providing a service. If it is determined that a particular circuit is providing 75% of the services to a customer, than that circuit may be migrated first or generally before another circuit which may not be providing services to the customer or may have less of an impact on the customer's services or may currently provide lower priority services. In another example, if more revenue is associated with a set of one or more circuits, then that set of circuits may be given a higher priority in the migration sequencing. Could be done in a batch. For example, if a circuit is associated with a legacy product that is being mapped to a new product on the target infrastructure that is estimated to return 110-120% because there's an up sale, that product is migrated first. Information from the joined circuits dataset 406, and the product mappings and pricing is included in the LMAR at 457 to determine the migration plan 459 that can optimize QoS and revenue.

From LMARs stored in the LMAR dataset 458, migration plans 459, migration playbooks 462, migration offers 464 and migration orders 467 are created at 460. Multiple migration plans may be created varying approaches or migration parameters to select an optimal migration plan. A migration plan for example includes a set of legacy circuits and sequencing for migration. The plan may group the circuits by customer, customer segment, wire center or product. The plan takes into consideration when the new infrastructure is ready for the migration, such as when the transport and target infrastructure circuits are installed and ready to provide the target services.

At 461, a migration playbook is created. The migration playbook for example includes is an output from a scenario plan. The migration playbook can take a series of migrations and put them together and contain the sequencing and the options for migration.

At 463 a migration offer is created. The migration offer for example includes an offer to the customer for the target products and prices, and may include monetary inducement to migrate.

At 460 a migration order is created. The migration order for example includes dates for migration if an offer is accepted. When an order is created, additional information at 465 may be needed to automatically create the order from the network element dataset 429. The additional information may be information related to the service and circuits providing the service.

At 470, the circuits are provisioned to provide the ordered services and according to a migration plan. The provisioning may include auto-configuration of parameters of the circuits which may be performed by the network provisioning subsystem 141 described above.

Figure 5:
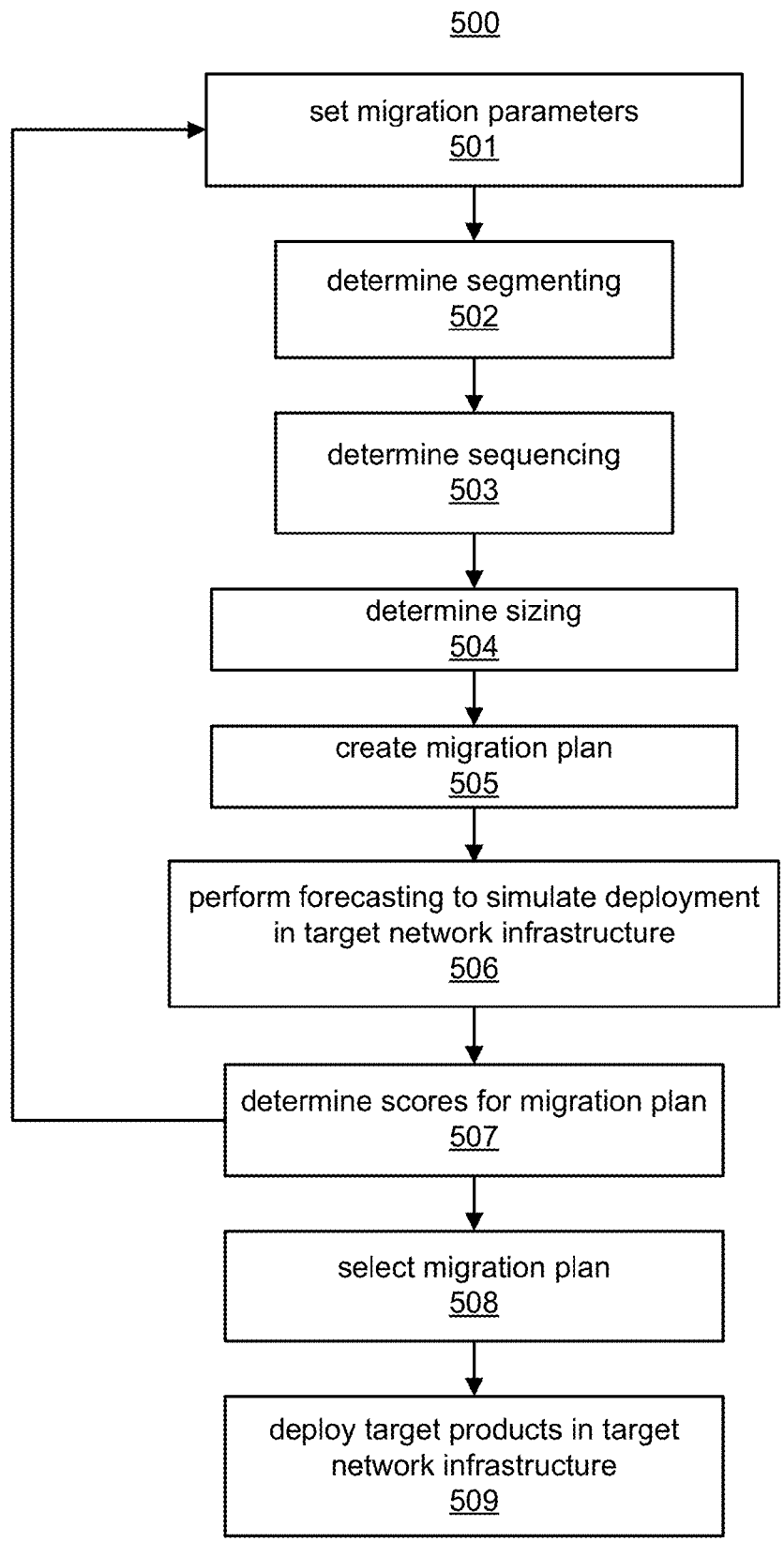
FIG. 5 illustrates a method according to an embodiment for creating a migration plan.

FIG. 5 illustrates a method 500 according to an embodiment for creating a migration plan, and forecasting and scoring the migration plan. The migration plan may be an LMSP and is shown in FIG. 4 and described with respect to 441 and 442. Furthermore, the steps of the method 500 may be performed by the migration sequencing server shown in FIG. 2B and the LMSP creator 113 and the simulation and forecasting stage 120 shown in FIG. 3A.

At 501, migration parameters are set. In one example, a user enters migration parameters and the migration parameters are stored by the system 100. The system 100 may include templates displayed via the dashboard 131 that include default values for the migration parameters, segmenting information, sequencing information and sizing information. The user can modify the default values as needed and the values are stored.

The LMSP can be constrained by resource assignment, duration or other factors that may be specified as migration parameters. Some additional examples of the migration parameters may include but are not limited to: customer migration rate by segment, target product unit price, customer migration velocity by segment, network migration velocity by segment, CPE costs, labor rates by location, wire center operating cost savings, capital expenditure, and operating cost savings due to legacy product retirement.

At 502, segmenting is determined. Segmenting is the determination of whether customers, products, wire centers, etc., are to be grouped and considered as a group for the migration plan or whether they should be treated individually. For example, an LMSP can be scoped to a segment, such as being scoped to an individual customer, a group of customers, a customer segment, a group of customer segments, an individual wire center, a group of wire centers, an individual legacy product or a group of legacy products. Also, LMSPs may be structured hierarchically. For example, a product scenario LMSP may aggregate one or more wire center LMSPs, and a wire center LMSP may aggregate one or more customer LMSPs based on the scope of the plan. Different planning methods, sequences, and templates are applied based on customer segmentation.

Discrete migration is a customer migration for a single location customer executed via a single work flow. This is the simplest kind of customer migration. Coordinated migration is a customer migration for multi-product, multi-location customers executed via multiple, coordinated work flows. Coordinated migration is an aggregate of multiple discrete migrations.

Segmenting can allow the largest customers to be planned and coordinated via a more detailed method and the smallest customers to be macro modeled in bulk. Medium sized customers are segmented for individual or macro modeling based on set of system rules. This approach allows for the automated bulk planning of most customers and detailed coordination planning of the carrier's most important and complex customers. The criteria for deciding bulk verses individualized detailed planning is based on the segment that the carrier has assigned to the customer. Examples of segments are now described. Enterprise segment customers are individually modeled via a set of one or more coordinated migration plans. Small business segment customers that subscribe to multiple products across multiple service locations are also individually modeled via a coordinated migration plan. The small business segment customers that are served via a single service address are modeled in bulk as discrete migrations. The consumer segment is modeled in bulk as discrete migrations.

At 503, sequencing is determined. Sequencing includes organizing migrations into a series of sequential and/or simultaneous work flows. Sequencing may be determined from a sequencing approach selected by a user. Examples of different approaches may include the following:

Customer Approach
    By Coordinated then Discrete
    By Discrete then Coordinated
    From highest to smallest revenue
    From smallest to largest revenue
    From most to least products
    From least to most products;
Service Address Approach
    Migrate all products at Service Address together;
Circuit Approach
    Migrate all products provisioned on circuit together;
Product Approach
    By most labor intensive to least labor intensive
    By least labor intensive to most labor intensive
    From high to low customer impact
    From low to high customer impact For example, if a customer approach is taken, sequencing may include migrating customer-by-customer. For example, technicians got o to an enterprise customer site and do everything in that site and work their way through, customer-by-customer. In another example, migration is performed circuit-by-circuit which may cause operational expenses to increase. However, due to customer constraints, customers may not be able to migrate site-by-site due to customer constraints. A customer may not allow certain services to be changed at particular times, so this is provided as a constraint parameter and is used to determine the sequence for migration.

At 504, sizing is determined. Sizing includes calculating a migration plan's capital expense, migration costs, labor resources and or duration. Each LMSP may have a set of sizing parameters. Sizing parameters may define labor hours and rates by role. Roles may be broken down by functional area, such as program management, customer communications, account management, network engineering, and customer care. Labor roles are applied across each of the coordinated and discrete customer migration plans contained with the scenario plan.

Figure 6:
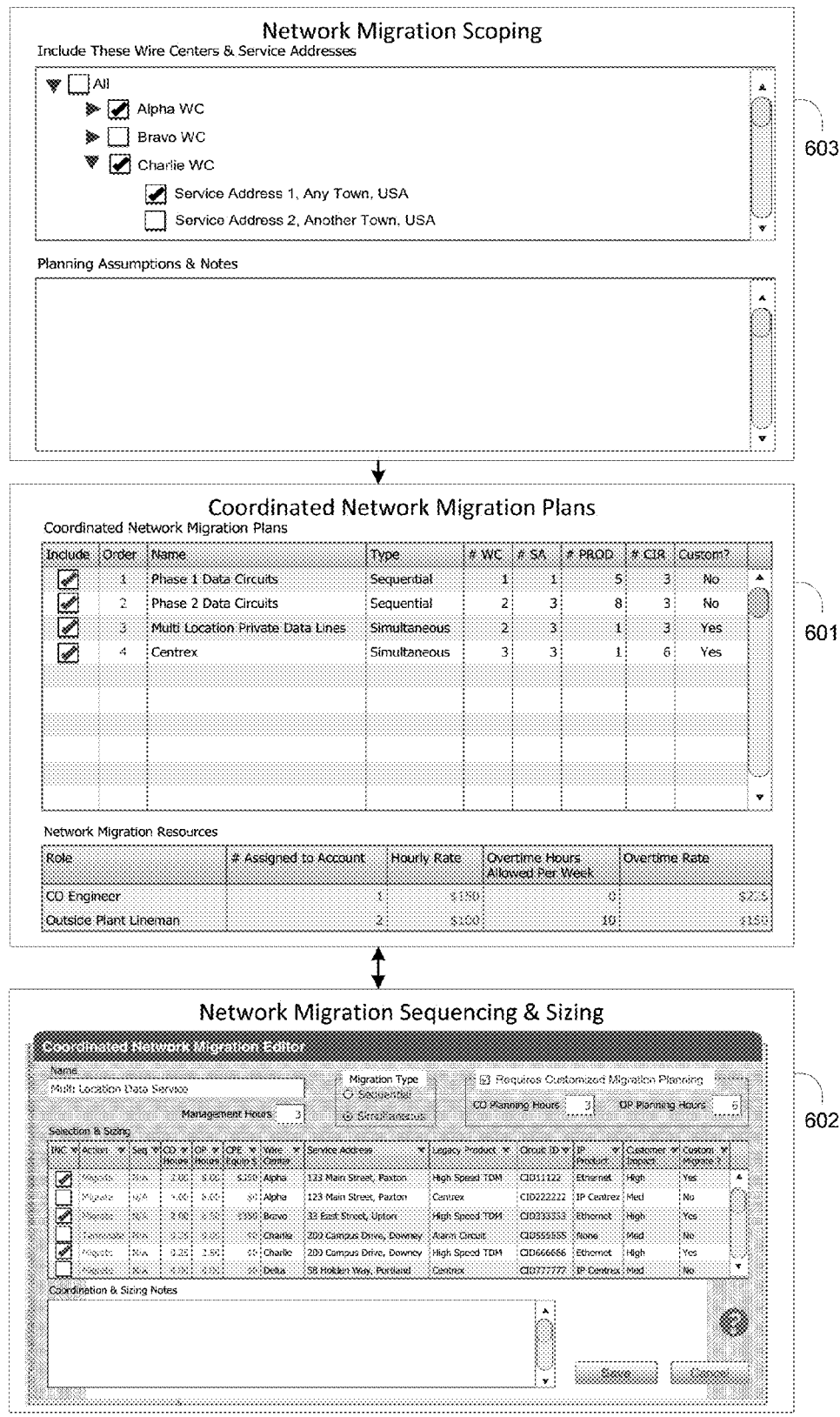
FIG. 6 shows an example of a migration plan.

At 505, a migration plan is created based on the migration parameters, segmenting, sequencing and sizing. An example of a migration plan is shown in FIG. 6. In FIG. 6, a coordinated network migration plan at 601 for a customer. 602 shows an example of an individual network migration plan for Multi Location Private Data Lines/Data Services that is included in the coordinated network migration plan at 601. Sequencing and sizing information is included in the plans. For example, sequential or simultaneous refers to the sequencing of products for the customer. As shown in 602, the legacy products and the corresponding target product are shown in each row, which may be determined from the product mapping information (e.g., an LMAR including product mappings in the product mappings dataset 412), along with circuit ID for the legacy product, wire center, etc., which may be determined from the LMAR including information from the joined circuits dataset 406. Sizing information is also shown, such as by role, number of hours, etc. Also, customer impact, such as low, medium or high, is shown and may be used for sequencing. 603 shows network migration scoping, whereby, a list of products, wire centers and service addresses are shown for a customer and may be selected for the migration.

At 506 in FIG. 5, forecasting is performed by the system 100 to simulate the deploying of the target products. Multiple metrics are forecasted by the system 100 for the simulation. For example, migration rate from a legacy product to a particular product is estimated based on historic information. Migration rate is the number of current subscribers of a legacy product that will migrate to a particular target product. In many situations, the service provider deploys the target network infrastructure but does not know whether the customers will migrate to a new target product or will go with another service provider. Furthermore, multiple target products may map to a single legacy product, and it is not known which target product will be selected by a customer if the customer decides to stay with the service provider. The system 100 estimates the number of customers that will subscribe to each target product for the simulation. Also, based on the estimation, capacity planning is performed for the target network infrastructure to ensure the circuits in the target infrastructure can meet the service level requirements which may be specified in service level agreements with the customers. This may include provisioning hardware that provides adequate bandwidth for the estimated number of target products.

In one example, a clustering algorithm is used for forecasting that clusters customers by attributes. K-means clusters may be used to create clusters based on attributes of customers and then assign each customer to a cluster that has the attributes of the cluster or the closest matching cluster. The clusters may be created from a historic dataset of customer migration information that may include information for many thousands of customers. The following steps may be performed for K-means clustering: 1. start with a randomly selected K seeds that will be the seeds for the K clusters; 2. allocate the objects to each nearest seed; 3. compute the new centroid of each cluster and set these as the new seeds; and 4. repeat from 2 until the centroids will not change. The seed for example is an initial set of attributes that define a cluster and the objects are the customers. Once the clusters are determined, migration rates are determined for each cluster. Then, these migration rates can be applied to the customers of the legacy products in the legacy network infrastructure to estimate the migration rate of target products. Based on the estimate of migration rate for each target product, other information can be estimated for the target products such as costs, revenue, profit, return on investment, etc.

Figure 7:
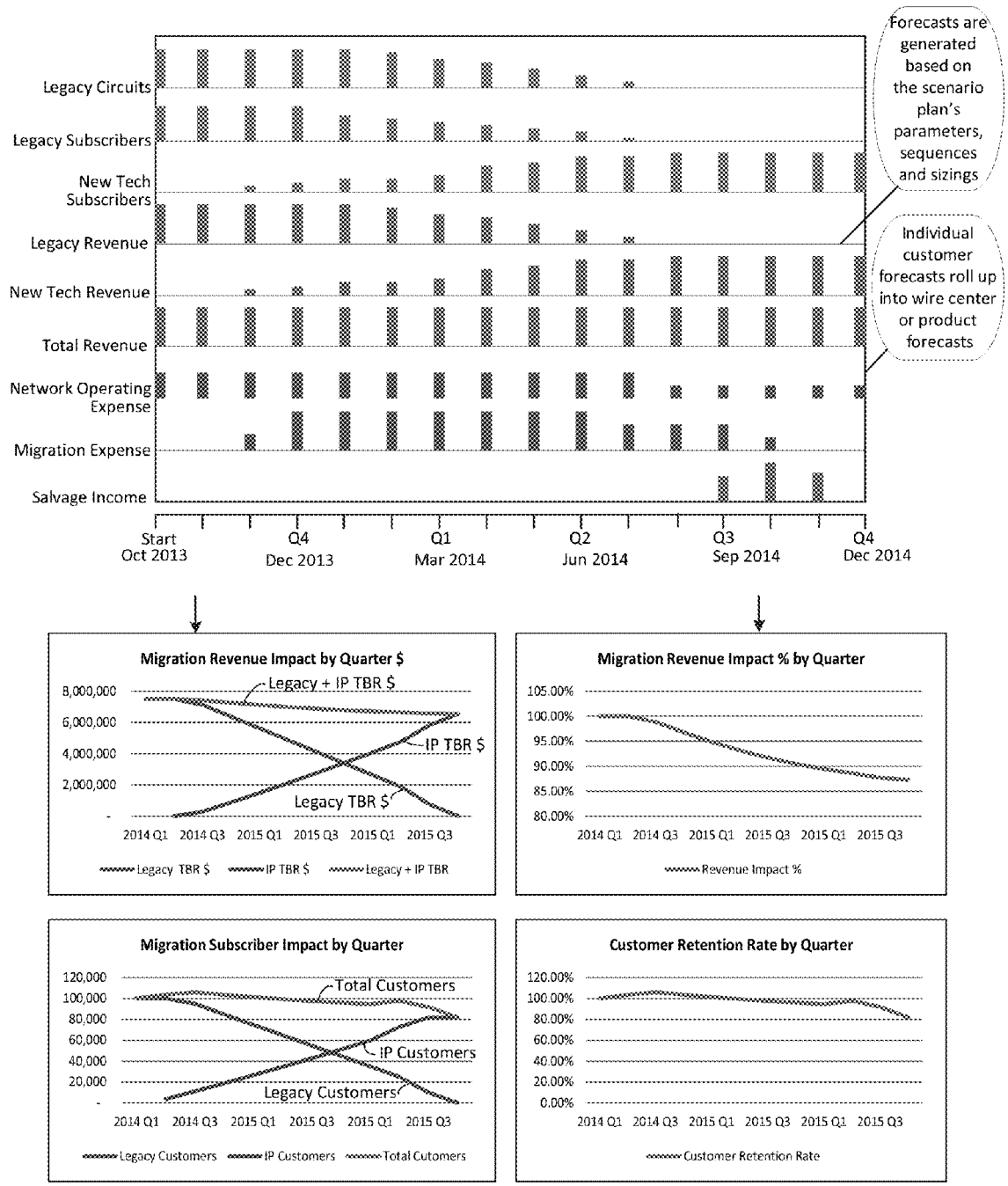
FIG. 7 shows an example of forecasted metrics over time for a migration plan.
Figure 8:
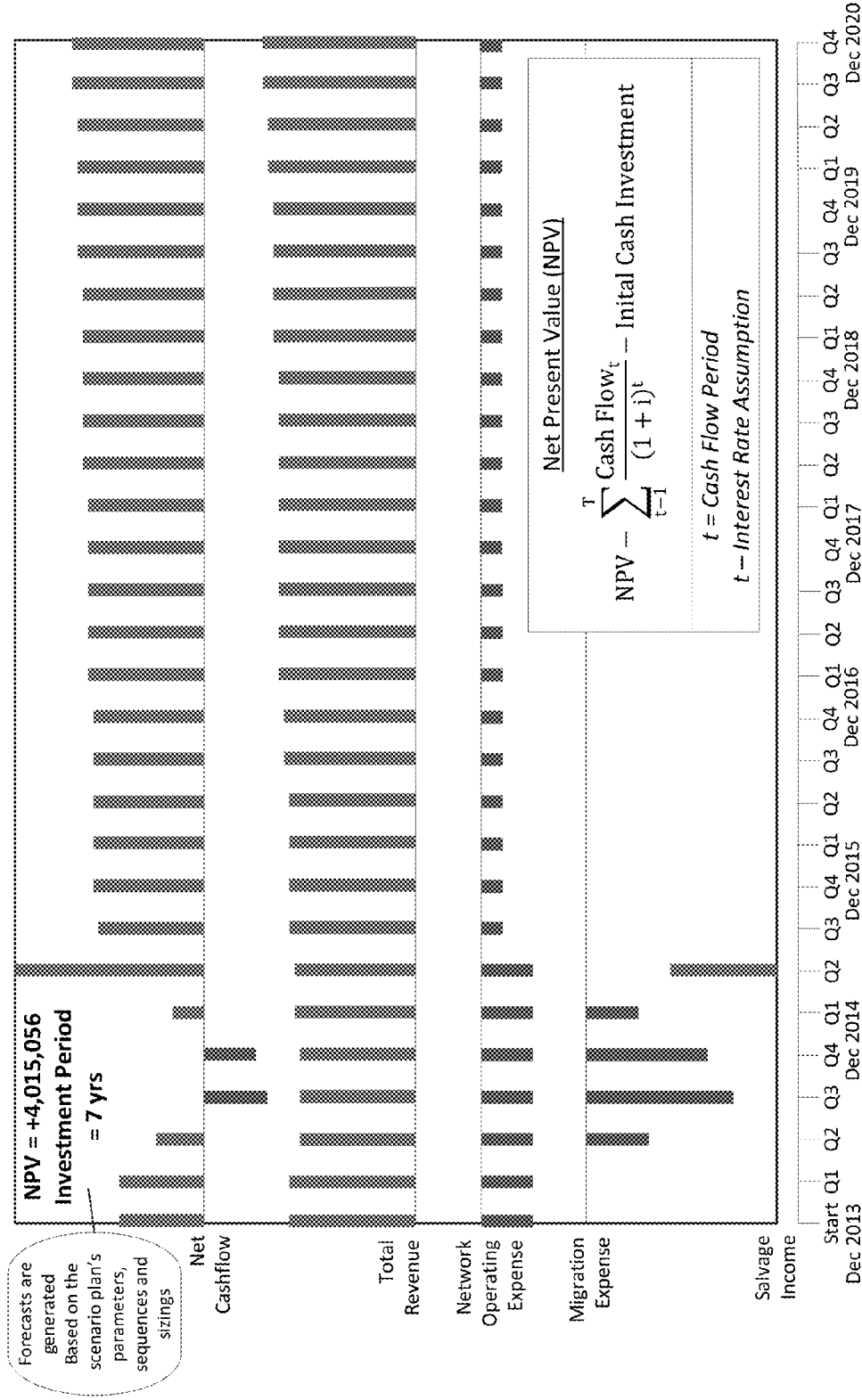
FIG. 8 shows an example of net present values for forecasted metrics.

FIG. 7 shows an example of forecasted metrics over time for a migration plan. The forecasted metrics may include legacy circuits, legacy subscribers, new tech subscribers, legacy revenue, new tech revenue, total revenue, network operating expense, migration expense and salvage income. 701 shows a bar graph of the forecasted metrics, and 702 shows line graphs of the forecasted metrics by quarter. For the forecasted metrics that are measured in terms of a monetary value, a net present value is determined. FIG. 8 shows an example of the net present value determined for forecasted metrics.

Referring back to FIG. 5, at 507, scores are determined for the migration plan based on the forecasts. The migration plan is scored by multiple dimensions including: customer impact, complexity, size, productivity, capital investment, reoccurring revenue, onetime expense, onetime salvage recovery and reoccurring savings. Each migration plan has a single aggregate score assigned to it. The aggregate score is calculated using all of the individual scores.

At 508, a migration plan is selected and at 509 the target products are deployed according to the selected plan. A migration plan may be selected based on the forecasts. For example, the scores are determined based on the forecasts and the plan is selected based on the scores. The target products are deployed for example if they are ordered by the customer. The provisioning subsystem of the system 100 automatically configures circuits in the target network infrastructure to deploy the target products.

FIG. 9 shows an example of scores generated for a migration plan. In one example, scores for expenses and revenue may be determined based on their net present value. For example, the scores shown in FIG. 9 for capital expenditure (CAPEX), revenue gain, migration and salvage costs, salvage recovery, etc., may be based on net present value. Examples of net present values are shown in FIG. 8. In one example, ranges are selected for a score, and if the net present value falls within a range of a particular score, then that score is applied. Other scores, such as for number of migrations and number of circuits, may also be determined from predetermined ranges. The complexity score may be based on the number of circuits, number of migrations, number of customers, and number of products. These values are combined to determine the complexity score.

As shown in FIG. 9, an aggregate score, an estimated net present value and an estimated rate of return (ROI) are determined for the migration plan. The aggregated score is calculated as a function of the individual scores, which may be weighted. The aggregate score and/or individual scores, the estimated net present value and the ROI may be used to compare migration plans. Multiple different migration plans may be simulated by repeating steps 501-507. Steps 501-507 may be repeated a finite number of times according to the number of migration plans the user wants to create. Migration parameters, sizing, segmentation, migration approach for sequence, scope, etc., may be varied to determine different migration plans and score the plans. Scores, net present value and ROI may be compared to select the optimal migration plan to implement.

The system 100 can also automatically optimize a migration plan by changing one or more of the factors that are used to generate the migration plan, such as migration parameters, sizing, segmentation, migration approach for sequence, scope, etc., according to a predetermined objective. For example, one or more of the following objectives are selected by the user: minimize customer impact, minimize cost, minimize time, maximize revenue, and maximize return on investment. The factors are varied to achieve the objective. In one example, logistic regression is used to determine the factors to achieve the objective. Sequences of logistic regressions isolate and measure the impact of the factors on the objective. Logistic regression is a well-established statistical technique that estimates the outcome of dependent variable, which is the objective in this case. Logistic regression measures the relationship between a categorical dependent variable and one or more independent variables, which may include the factors described above, by using probability scores as the predicted values of the dependent variable.

One or more of the steps of the methods described herein and other steps described herein and one or more of the components of the systems described herein may be implemented as computer code stored on a computer readable storage medium, such as the memory and/or secondary storage, and executed on a computer system, for example, by a processor, application-specific integrated circuit (ASIC), or other controller. The code may exist as software program(s) comprised of program instructions in source code, object code, executable code or other formats. Examples of computer readable storage medium include conventional computer system RAM (random access memory), ROM (read only memory), EPROM (erasable, programmable ROM), EEPROM (electrically erasable, programmable ROM), hard drives, and flash memory.

While the embodiments have been described with reference to examples, those skilled in the art will be able to make various modifications to the described embodiments without departing from the scope of the claimed embodiments.

What is claimed is:

1. A system to migrate network services from a first network infrastructure to a second network infrastructure, the system comprising:

the first network infrastructure comprising a first set of circuits providing voice and data services over a network to customer premises; and a service provider network migration system including at least one inventory and provisioning server to capture data from the plurality of circuits in the first network infrastructure and to configure circuits in the second network infrastructure, wherein the service provider network migration system includes at least one migration sequencing server to access one or more databases storing a provisioned circuits dataset including information for the plurality of circuits in the first network infrastructure; and a billing dataset including information for customers at the customer premises, wherein the migration sequencing server comprises:

a modeler and reconcilator generating a joined circuits dataset from the information in the provisioned circuits dataset and the billing dataset, the joined circuits dataset associating each of the plurality of circuits in the first network infrastructure with at least one voice or data service provided by the circuit and a customer receiving the at least one voice or data service;

a migration plan creator to receive migration parameters for migrating the voice and data services from the first technology infrastructure to target services in the second technology infrastructure, the migration parameters including sequencing information for migration to the target services in the second network infrastructure, wherein the migration plan creator creates a migration plan for migrating the voice and data services to the target services in the second network infrastructure based on the joined circuits dataset and the migration parameters, wherein the migration plan includes a sequence for the migration;

a simulator determining forecasts for customer migration rate and revenue generation for the target services based on the migration plan, historic customer migration data and attributes of customers subscribed to the voice and data services provided in the first network infrastructure; and a scenario plan scorer generating scores for the migration plan based on metrics determined for the migration plan and the forecasts, wherein the metrics include at least a plurality of: customer migration impact level, complexity for migration to the second network infrastructure, size based on number of circuits in the second network infrastructure, migration costs, salvage recovery, and return on investment;

wherein if the migration plan is selected for implementation based on the forecasts, the inventory and provisioning server configures parameters for the circuits in the second network infrastructure via a network according to the migration plan to deploy the target services in the second network infrastructure.

2. The system according to claim 1, wherein the migration sequencing server determines and stores a product mappings dataset in the one or more databases, wherein the product mappings dataset comprises a mapping for each of the voice and data services to at least one the target services, and the migration plan creator determines the at least one the target service for each of the voice and data services and pricing for the at least one the target service to include in the migration plan from the product mappings dataset.

3. The system according to claim 1, wherein the service provider network migration system stores datasets indicating availability of transport infrastructure for the target services, availability of the target services in the second network infrastructure, and contract constraints for the target services, and the migration plan creator determines the sequencing for the migration plan based on the availability of the transport infrastructure, the availability of the target services in the second network infrastructure, and the contract constraints.

4. The system of claim 1, wherein the service provider network migration system generates and stores legacy network migration records (LMARs), wherein each LMAR includes a customer subscribing to at least one of the data and voice services in the first network infrastructure, demographics for the customer, a customer service address, a circuit providing the at least one data and voice service in the first network infrastructure, a wire center including the circuit that services the customer, a billing rate and revenue generated for the at least one data and voice service at least record, and at least of the target services mapped to the at least one data and voice service, wherein the migration plan and the forecasts are determined from the LMARs.

5. The system of claim 1, wherein the simulator simulates a plurality of migration plans, and determines forecasts for each migration plan, and the scenario plan scorer determines a score for each migration plan based on the simulations, wherein the scores are compared to prioritize the migration plans according to the scores and are presented via a dashboard indicating the priority.

6. A service provider network migration system to migrate services from a first network infrastructure to a second network infrastructure, the system comprising:
one or more databases storing
a joined circuits dataset associating each of a plurality of circuits in the first network infrastructure with a service provided by the circuit and a customer receiving the service,
a product mappings dataset including a mapping for each service in the first network infrastructure to at least one target service of a plurality of target services to be provided in the second network infrastructure, and
legacy network migration records (LMARs), wherein each LMAR includes customer information for a customer, any services subscribed to by the customer in the first network infrastructure, a circuit in the first network infrastructure providing each service subscribed to by the customer, a wire center including the circuit that services the customer, revenue information associated with revenue generated by the subscribed service, and at least of the target services mapped to each subscribed service; and
at least one migration sequencing server comprising:
a modeler and reconcilator generating the joined circuits dataset;
a migration plan creator to receive migration parameters for migrating the services from the first technology infrastructure to the target services in the second technology infrastructure, the migration parameters including sequencing information for migration of the plurality of circuits in the first network infrastructure to the circuits in the second network infrastructure providing the target services,
wherein the migration plan creator creates a migration plan for migrating to the target services in the second network infrastructure based on the joined circuits dataset, the product mappings dataset, the LMARs and the migration parameters, wherein the migration plan includes a sequence for migrating to the target services in the second network infrastructure;
a simulator determining forecasts for customer migration rate and revenue generation for the target services based on the migration plan, historic customer migration data and attributes of the customers; and
a scenario plan scorer generating scores for the migration plan based on metrics determined for the migration plan and the forecasts, wherein the metrics include at least a plurality of: customer migration impact level, complexity for migration to the second network infrastructure, size based on number of circuits in the second network infrastructure, migration costs, salvage recovery, and return on investment,
wherein if the migration plan is selected for implementation based on the forecasts, an inventory and provisioning server configures parameters for the circuits in the second network infrastructure via a network according to the migration plan to deploy the target services in the second network infrastructure.

7. The service provider network migration system according to claim 6, wherein the one or more databases store datasets indicating availability of transport infrastructure for the target services, availability of the target services in the second network infrastructure, and contract constraints for the target services, and the migration plan creator determines the sequencing for the migration plan based on the availability of the transport infrastructure, the availability of the target services in the second network infrastructure, and the contract constraints.

8. The service provider network migration system of claim 6, wherein the simulator simulates a plurality of migration plans, and determines forecasts for each migration plan, and the scenario plan scorer determines a score for each migration plan based on the simulations, wherein the scores are compared to prioritize the migration plans according to the scores and are presented via a dashboard indicating the priority.

9. A method of migrating services from a first network infrastructure to a second network infrastructure, the method comprising:
determining a joined circuits dataset associating each of a plurality of circuits in the first network infrastructure with a service provided by the circuit and a customer receiving the service;
determining a product mappings dataset including a mapping for each service in the first network infrastructure to at least one target service of a plurality of target services to be provided in the second network infrastructure;
receiving migration parameters for migrating the services from the first technology infrastructure to the target services in the second technology infrastructure, the migration parameters including sequencing information for migration to the target services;
creating a migration plan for migrating to the target services in the second network infrastructure based on the joined circuits dataset, the product mappings dataset, and the migration parameters, wherein the migration plan includes a sequence for migrating to the target services in the second network infrastructure;
determining forecasts for customer migration rate and revenue generation for the target services based on the migration plan, historic customer migration data and attributes of the customers; and
generating scores for the migration plan based on metrics determined for the migration plan and the forecasts, wherein the metrics include at least plurality of: customer migration impact level, complexity for migration to the second network infrastructure, size based on number of circuits in the second network infrastructure, migration costs, salvage recovery, and return on investment,
wherein if the migration plan is selected for implementation based on the forecasts, configuring parameters for the circuits in the second network infrastructure via a network according to the migration plan to deploy the target services in the second network infrastructure.

10. The method of claim 9, comprising:
storing datasets indicating availability of transport infrastructure for the target services, availability of the target services in the second network infrastructure, and contract constraints for the target services; and
determining the sequencing for the migration plan based on the availability of the transport infrastructure, the availability of the target services in the second network infrastructure, and the contract constraints.

11. The method of claim 9, comprising:
simulating a plurality of migration plans;
determining forecasts for each migration plan;
determining a score for each migration plan based on the simulations;

comparing the scores to prioritize the migration plans according to the scores; and presenting the comparison via a dashboard.

12. The method of claim 11, wherein determining a score for each migration plan based on the simulations comprises:

determining a score card for each migration plan, wherein the score card comprises a plurality of scored metrics associated with customer migration impact level, complexity of the migration, number of circuits in the second network infrastructure, number of migrated circuits, migration execution time, operating and capital expenses, salvage revenue, and gained customer revenue from the migration.

13. The method of claim 9, comprising:

querying network elements in the first network infrastructure to determine network parameters for the network elements, wherein the network parameters are used to determine the joined circuits dataset.

14. The method of claim 9, comprising:

remotely configuring network elements in the second network infrastructure via a network to set network parameters for the network elements.

15. The method of claim 9, comprising:

determining at least one of a customer approach, a service address approach, a circuit approach, and a product approach for migrating the services from the first technology infrastructure to the target services in the second technology infrastructure.

16. The method of claim 15, wherein the determined approach includes the sequencing information.

17. The method of claim 9, comprising:

storing legacy network migration records (LMARs) to create migration plans, wherein each LMAR includes a customer information for a customer, any services subscribed to by the customer in the first network infrastructure, a circuit in the first network infrastructure providing each service subscribed to by the customer, a wire center including the circuit that services the customer, revenue information associated with revenue generated by the subscribed service, and at least of the target services mapped to each subscribed service.

* * * * *